United States Patent
Ueda et al.

Patent Number: 5,985,014
Date of Patent: Nov. 16, 1999

[54] INK FOR INK-JET RECORDING CONTAINING SPECIFIED GLYCOL DERIVATIVES

[75] Inventors: Takamasa Ueda, Ibaraki; Toshiya Natsuhara, Takarazuka; Masaki Asano; Hideo Hotomi, both of Nishinomiya, all of Japan

[73] Assignee: Minolta Co., Ltd., Osaka, Japan

[21] Appl. No.: 08/937,181

[22] Filed: Sep. 29, 1997

[30] Foreign Application Priority Data

Oct. 1, 1996 [JP] Japan ................................ 8-260616

[51] Int. Cl.⁶ .................................................. C09D 11/00
[52] U.S. Cl. ...................................... 106/31.58; 106/31.86
[58] Field of Search ............................... 106/31.58, 31.86

[56] References Cited

U.S. PATENT DOCUMENTS

| | | |
|---|---|---|
| 4,285,727 | 8/1981 | Uehara et al. |
| 4,325,735 | 4/1982 | Ohta et al. |
| 4,421,559 | 12/1983 | Owatari. |
| 4,853,037 | 8/1989 | Johnson et al. |
| 5,108,503 | 4/1992 | Hindagolla et al. |
| 5,116,409 | 5/1992 | Moffatt ..................................... 106/22 |
| 5,211,747 | 5/1993 | Breton et al. |
| 5,356,464 | 10/1994 | Hickman et al. |
| 5,397,386 | 3/1995 | Nakazawa et al. |
| 5,431,722 | 7/1995 | Yamashita et al. |
| 5,843,217 | 12/1998 | Ueda et al. ............................ 106/31.48 |

FOREIGN PATENT DOCUMENTS

0769536 A2  4/1997  European Pat. Off.

*Primary Examiner*—Mark L. Bell
*Assistant Examiner*—Veronica Faison
*Attorney, Agent, or Firm*—McDermott, Will & Emery

[57] ABSTRACT

The present invention relates to an ink for ink-jetting containing at least a coloring material, water soluble organic solvent and water, comprising:

0.01–5.0% by weight of alkylene oxide adduct of acetylene glycol, represented by the formula (A):

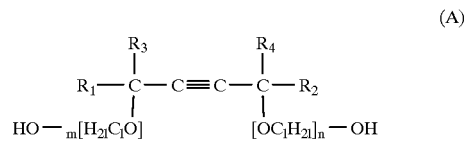

(in which $R_1$–$R_4$, are respectively an lower alkyl group; l is an integer of 2 or 3; and m and n are respectively an integer of 1 or more);

6.0–14.0% by weight of a compound selected from the group consisting of a polyalcohol having three hydroxy groups, alkylene glycols represented by the formula (B):

$$HO(C_xH_{2x}O)_yH \qquad (B)$$

(in which x and y is respectively an integer, provided that x is 2 or more and x and y have a relation of $2 \leq X \times y \leq 6$), and a mixture thereof;

4.0–10.0% by weight of a lower alkyl ether of alkylene glycol represented by the formula (C):

$$HO(C_pH_{2p}O)_qR \qquad (C)$$

(in which R is a lower alkyl group, p and q is respectively an integer, provided that p is 2 or more and p and q have a relation of $2 \leq p \times q \leq 6$), or a mixture thereof, 2.0–8.0% by weight of polyalkylene glycol having a molecular weight of 150–600; and water, % by weight being based on total weight of the ink.

20 Claims, No Drawings

INK FOR INK-JET RECORDING CONTAINING SPECIFIED GLYCOL DERIVATIVES

BACKGROUND OF THE INVENTION

1. Field of the Invention

The present Invention relates to an ink used in an ink-jet recording printer.

2. Description of the Prior Art

In general, an ink used in an ink-jet recording printer is the one with a coloring material dissolved or dispersed in a medium such as water, organic solvent and mixture thereof. A color ink, such as yellow, cyan, magenta, and black is used to replicate color images.

An ink for jet-recording is required to be excellent in antifoaming properties because air bubbles may be formed inside ink-flow channel in a recording head to cause dot-like defects in recorded images. Japanese Patent Laid-Open No. Hei 6-256696 (USP5397386), for example, proposes to use surfactants of acetylene glycols in order to provide an ink excellent in antifoaming properties. The ink disclosed in the above reference, however, can not satisfy high stability of reservation required of the ink for ink-jetting, especially stability of reservation resistant to rapid temperature change. Clogging of nozzle is liable to occur. There is also a problem of poor resistance to light of printed images. Therefore, performances of conventional ink for ink-jetting are required to be improved.

SUMMARY OF THE INVENTION

The present invention is to provide an ink for ink-jetting excellent in stability of preservation, especially high stability of preservation resistant rapid temperature-change, without nozzle clogging.

Further, the present invention is to provide an ink for ink-jetting which can form printed images excellent in resistance to light.

The present invention is still further to provide to an ink for ink-jetting showing low temperature-dependency in practical use.

The present invention relates to an ink for ink-jetting containing at least a coloring material, water soluble organic solvent and water, comprising:

0.01–5.0% by weight of alkylene oxide adduct of acetylene glycol, represented by the formula (A):

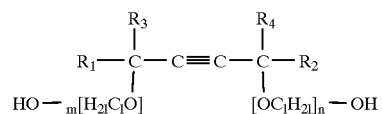

(A)

(in which $R_1$–$R_4$ are respectively an lower alkyl group; l is an integer of 2 or 3; and m and n are respectively an integer of 1 or more);

6.0–14.0% by weight of a compound selected from the group consisting of a polyalcohol having three hydroxy groups, alkylene glycols represented by the formula (B):

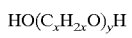 (B)

(in which x and y is respectively an integer, provided that x is 2 or more and x and y have a relation of $2 \leq x \times y \leq 6$), and a mixture thereof;

4.0–10.0% by weight of a lower alkyl ether of alkylene glycol represented by the formula (C):

 (C)

(in which R is a lower alkyl group, p and q is respectively an integer, provided that p is 2 or more and p and q have a relation of $2 \leq p \times q \leq 6$), or a mixture thereof, 2.0–8.0% by weight of polyalkylene glycol having a molecular weight of 150–600; and water, % by weight being based on total weight of the ink.

DETAILED DESCRIPTION OF THE INVENTION

The present invention provides an ink for ink-jetting containing at least a coloring material, water soluble organic solvent and water, comprising:

0.01–5.0% by weight of alkylene oxide adduct of acetylene glycol, represented by the formula (A):

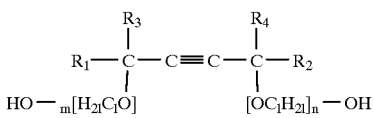

(A)

(in which $R_1$–$R_4$ are respectively an lower alkyl group; l is an integer of 2 or 3; and m and n ate respectively an integer of 1 or more);

6.0–14.0% by weight of a compound selected from the group consisting of a polyalcohol having three hydroxy groups, alkylene glycols represented by the formula (B):

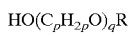 (B)

(in which x and y is respectively an integer, provided that x is 2 or more and x and y have a relation of $2 \leq x \times y \leq 6$), and a mixture thereof;

4.0–10.0% by weight of a lower alkyl ether of alkylene glycol represented by the formula (C):

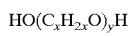 (C)

(in which R is a lower alkyl group, p and q is respectively an integer, provided that p is 2 or more and p and q have a relation of $2 \leq p \times q \leq 6$), or a mixture thereof, 2.0–8.0% by weight of polyalkylene glycol having a molecular weight of 150–600; and water, % by weight being based on total weight of the ink.

As to the coloring materials, any coloring material may be used, such as an acid dye, a direct dye, a basic dye, a reactive dye, a food, color, a disperse dye, an oil soluble dye, and a pigment. Among these materials, water soluble coloring materials are preferred. A content of the coloring materials contained in the ink composition depends on a kind of coloring material, ink medium and properties required of ink. In general, the content is 0.5–10% by weight, preferably 2–6% by weight.

The ink for ink-jetting is required to control ink-blurring and stabilize ink-jetting properties from nozzle. Therefore it is necessary to adjust surface tension of ink within a specific range. Usually, a surfactant is added into ink. In the present invention, the alkylene oxide adduct of acetylene glycol represented by the formula (A) is added into ink as surfactant to adjust surface tension of ink to the range between 30 and 50 dyn/cm (25° C.). As the properties of the surfactant of the formula (A) itself depend little on temperature, the surfactant can improve stability of surface tension and viscosity of ink not depending on temperature.

In the formula (A), $R_1$ and $R_2$ are preferably same and an C1–C5 lower alkyl group, preferably C2–C4 lower alkyl group, more preferably an isobutyl group. $R_3$ and $R_4$ are preferably same and an C1–C5 lower alkyl group, preferably a methyl group. An alkylene oxide to be added is ethylene oxide, or propylene oxide. Ethylene oxide is particularly preferable. The symbol m and n may be same or different. An total of m+n is within 2–60, preferably 2–30, more preferably 6–20.

The alkylene oxide adduct of acetylene glycol of the formula (A) in which $R_1$ and $R_2$ are respectively isobutyl, $R_3$ and $R_4$ are respectively methyl and "l" is 2 is available in the market as Olfine E1004 (m+n=3.5)(made by Nisshin Kagaku Kogyo K.K.), Olfine E1010 (m+n=10) (made by Nisshin Kagaku Kogyo K.K.) and Surfynol 485 (m+n=30) (made by AIR PRODUCTS K.K. in America), being useful for ink of the present invention.

The alkylene oxide adduct of acetylene glycol of the present invention is contained in ink at an amount of 0.01–5% by weight, preferably 0.1–5% by weight, more preferably 0.1–2% by weight. If the content is less than 0.01% by weight, effects of improvement of stability can not be achieved satisfactorily by its addition. If the content is more than 5% by weight, stability of ink resistant to temperature change is deteriorated.

The ink of the present invention contains 6.0–14.0% by weight of a compound selected from the group consisting of a polyalcohol having three hydroxy groups, mono-, di-, and trialkylene glycols represented by the formula (B):

$$HO(C_xH_{2x}O)_yH \qquad (B)$$

(in which x and y is respectively an integer, provided that x is 2 or more and x and y have a relation of $2 \leq x \times y \leq 6$), and a mixture thereof The polyalcohol having three hydroxy groups may be exemplified by glycerine.

Mono-, di-, or trialkylene glycol may be exemplified by monoalkylene, such as ethylene glycol, propylene glycol, butylene glycol and hexylene glycol, dialkylene glycol, such as diethylene glycol and dipropylene glycol, and trialkylene glycol, such as triethylene glycol. Particularly preferable mono-, di-, or trialkylene glycol is diethylene glycol.

The ink of the present invention contains 4.0–10.0% by weight of a lower alkyl ether of mono-, di-, or trialkylene glycol represented by the formula (C):

$$HO(C_pH_{2p}O)_qR \qquad (c)$$

(in which R is a lower alkyl group, x and y is respectively an integer, provided that p is 2 or more and p and q have a relation of $2 \leq p \times q \leq 6$), or a mixture thereof. The lower alkyl ether of mono-, di-, or trialkylene glycol may be exemplified by ethylene glycol methyl ether, ethylene glycol ethyl ether, diethylene glycol methyl ether, diethylene glycol ethyl ether, diethylene glycol butyl ether, and triethylene glycol butyl ether. Particularly preferable lower alkyl ether of mono-, di-, or trialkylene glycol is triethylene glycol butyl ether.

The ink of the present invention contains 2.0–8.0% by weight of polyalkylene glycol having a molecular weight of 150 or more, preferably 150–600. The polyalkylene glycol is exemplified by polyethylene glycol, polypropylene glycol, and copolymer of ethylene oxide and propylene oxide to be preferably used. In particular, polyethylene glycol having molecular weight of 150–600 is preferably used.

The addition of specified amount of polyalcohol, mono-, di-, or trialkylene glycol, lower alkyl ether of mono-, di-, or trialkylene glycol and polyalkylene glycol can achieve stability of preservation resistant to rapid temperature change. This stability has not been achieved. Moisture retention is improved, and clogging of nozzle is prevented. Further resistance to light of printed images can be achieved. Polyalcohol, mono-, di-, or trialkylene glycol, lower alkyl ether of mono-, di-, or trialkylene glycol and polyalkylene glycol are added so that a total amount thereof may be 10–30% by weight, preferably 13–25% by weight on the basis of total weight of ink. If the addition is less than 10% by weight, the above effects can not be achieved. If the addition is more than 30% by weight, viscosity of ink becomes too high, resulting in lowering of ink-flight response and slowing of fixing speed.

The ink of the present invention may contain aliphatic alcohol. The aliphatic alcohol may be exemplified by C1–C5 alkyl alcohol, preferably C1–C3 alkyl alcohol, such as methyl alcohol, ethyl alcohol, n-propyl alcohol and isopropyl alcohol. The aliphatic alcohol is added at an amount of 0.1–15% by weight, preferably 1–6% by weight on the basis of total weight of ink. The addition of aliphatic alcohol effects to improve drying characteristics and fixability of ink. These effects can not be obtained if the addition is low. If the addition is more than 15% by weight, there may often arise a problem, such as clogging of nozzle.

The ink of the present invention may preferably contain an amphiphilic agent. The amphiphilic agent may exemplified by urea, amide, cyclic amide, and alkanol amine. Particularly, alkanol amine, for example, triethanolamine is preferable. The amphiphilic agent is added at an amount of 0.001–5 by weight, preferably 0.1–2% by weight on the basis of total weight of ink. The addition of amphiphilic agent effects to prevent crystals from depositing with time, resulting in improvement of ink stability. These effects can not be obtained if the addition is less than 0.1% by weight. If the addition is more than 5% by weight, blur becomes conspicuous.

The ink of the present invention may contain alkali metal salt of ethylenediaminetetraacetate. Such a alkali metal salt of ethylenediaminetetraacetate may be exemplified by disodium salt, trisodium salt, tetrasodium salt. Tetrasodium is particularly preferable. The addition of ethylenediaminetetraacettate effects to prevent clogging of shotting opening of nozzle, resulting in improvement of stability of ink. Ethylenediaminetetraaceate is contained at an amount of 0.01–2% by weight, preferably 0.05–1% by weight on the basis of total weight of ink. If the content is less than 0.01% by weight, addition effects can not be achieved. The content of more than 2% by weight is not preferable as ink stability is affected adversely.

The ink of the present invention may contain a mixture containing at least one compound selected from the group consisting of NaOH, $NaHCO_3$ and $Na_2B_4O_7$ at an amount of 0.01–2% by weight, preferably 0.05–1% by weight on the basis of total weight of ink. Weight ratio of NaOH and $NaHCO_3$ is 1:2–1:50, preferably 1:5–1:30. The addition of the mixture effects to achieve high improvement of stability of preservation resistant to rapid temperature change and to improve stability resistant to temperature change within practical use-temperature. Moreover clogging of nozzle can be cancelled. Non-uniformity of dot diameter can be also restrained.

The ink of the present invention may contain any conventional additive other than the above, if necessary. Such an additive may be exemplified by an antifungal agent, an antiseptic agent, a pH modifier, a chelating agent, an oxygen-absorbent, a corrosion inhibitor and a quencher.

The ink of the present invention contains water at an amount of 60–90% by weight, preferably 70–90% by weight.

The ink of the present invention may be applied to any printer in so far as the printer adopts an ink-jet recording system. As the ink of the present invention has very low dependency of viscosity and surface tension on temperature, the ink of the present invention may be particularly applied to an ink-jet recording machine adopting piezosysten in which flight voltage is varied to change ink diameter of shotted ink for reproduction of gradation.

The present invention is further explained by Examples. It is of course not the intention hereby to limit the invention.

EXAMPLE

The ingredients shown below in each Example and comparative Example were mixed and sufficiently stirred to be dissolved. The resultant mixture were filtered. The filtered mixture was left to stand for 1 hour under vacuum conditions to be degassed. Thus, ink was prepared. Olfine E1010 (made by Nisshin Kagaku Kogyo K.K.) used in the examples below is the compound shown by the formula (A) in which $R_1$ and $R_2$ are respectively isobutyl, $R_3$ and $R_4$ are respectively methyl, "l" is 2 and m+n=10.

Example 1

| Composition | Content (% by weight) |
| --- | --- |
| Water | 76.0 |
| Diethylene glycol | 6.0 |
| Triethylene glycol butyl ether | 6.0 |
| Polyethylene glycol (#400: approximately 400 of molecular weight) | 4.0 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $NaHCO_3/NaOH$ (19:1) | 0.2 |
| EDTA4Na | 0.2 |
| 1,2-benzisothiazoline-3-on (fungicide) | 0.1 |
| Ethylalcohol | 2.0 |

Example 2

| Composition | Content (% by weight) |
| --- | --- |
| Water | 71.95 |
| Glycerine | 7.0 |
| Triethylene glycol butyl ether | 13.5 |
| Polyethylene glycol (#400) | 2.5 |
| C.I.27755 (black dye) | 4.4 |
| Olfine-E1004 (made by Nisshin Kagaku Kogyo K.K.) | 0.1 |
| $N(CH_2CH_2OH)_3$ | 0.05 |
| $NaHCO_3/NaOH$ (19:1) | 0.2 |
| EDTA4Na | 0.2 |
| 1,2-benzisothiazoline-3-on | 0.1 |

Example 3

| Composition | Content (% by weight) |
| --- | --- |
| Water | 71.7 |
| Diethylene glycol | 6.0 |
| Triethylene glycol butyl ether | 6.0 |
| Polyethylene glycol (#400) | 7.5 |
| C.I.27755 (black dye) | 5.5 |
| Olfine-E1010 (made by Nisshin Kagaku Kogyo K.K.) | 0.8 |
| $N(CH_2CH_2OH)_3$ | 2.0 |
| $Na_2B_4O_7/NaOH$ (19:1) | 0.2 |
| EDTA4Na | 0.2 |
| 1,2-benzisothiazoline-3-on | 0.1 |

Example 4

| Composition | Content (% by weight) |
| --- | --- |
| Water | 68.1 |
| Diethylene glycol | 10.0 |
| Triethylene glycol butyl ether | 7.0 |
| Polyethylene glycol (#400) | 4.5 |
| C.I.19140 (yellow dye) | 2.6 |
| Olfine-E1010 (made by Nisshin Kagaku Kogyo K.K.) | 2.8 |
| $N(CH_2CH_2OH)_3$ | 4.5 |
| $NaHCO_3/NaOH$ (19:1) | 0.2 |
| EDTA4Na | 0.2 |
| 1,2-benzisothiazoline-3-on | 0.1 |

Example 5

| Composition | Content (% by weight) |
| --- | --- |
| Water | 66.8 |
| Diethylene glycol | 13.0 |
| Triethylene glycol butyl ether | 7.0 |
| Polyethylene glycol (#400) | 4.2 |
| C.I.45100 (magenta dye) | 2.5 |
| Olfine-E1004 (made by Nisshin Kagaku Kogyo K.K.) | 4.5 |
| $N(CH_2CH_2OH)_3$ | 0.2 |
| $NaHCO_3/NaOH$ (19:1) | 0.2 |
| EDTA4Na | 0.5 |
| 1,2-benzisothiazoline-3-on | 0.1 |
| Isopropylalcohol | 1.0 |

Example 6

| Composition | Content (% by weight) |
| --- | --- |
| Water | 75.5 |
| Diethylene glycol (#400) | 12.0 |
| Triethylene glycol butyl ether | 4.0 |
| Polyethylene glycol | 4.0 |
| C.I.74180 (cyan dye) | 3.0 |
| Olfine-E1010 (made by Nisshin Kagaku Kogyo K.K.) | 0.8 |
| $N(CH_2CH_2OH)_3$ | 0.2 |
| $Na_2B_4O_7/NaOH$ (19:1) | 0.2 |
| EDTA4Na | 0.2 |
| 1,2-benzisothiazoline-3-on | 0.1 |

Example 7

| Composition | Content (% by weight) |
| --- | --- |
| Water | 77.0 |
| Diethylene glycol | 6.0 |
| Triethylene glycol butyl ether | 6.0 |
| Polyethylene glycol (#400) | 4.0 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $Ca(OH)_2$/NaOH (19:1) | 0.2 |
| Sodium gluconate | 0.2 |
| 1,2-benzisothiazoline-3-on | 0.1 |
| Ethylalcohol | 1.0 |

Comparative Example 1

| Composition | Content (% by weight) |
| --- | --- |
| Water | 77.8 |
| Diethylene glycol | 6.0 |
| Triethylene glycol butyl ether | 6.0 |
| Polyethylene glycol (#400) | 4.0 |
| C.I.27755 (black dye) | 4.5 |
| $N(CH_2CH_2OH)_3$ | 0.2 |
| $Ca(OH)_2$/NaOH (19:1) | 0.2 |
| Sodium gluconate | 0.2 |
| 1,2-benzisothiazoline-3-on | 0.1 |
| Ethylalcohol | 1.0 |

Comparative Example 2

| Composition | Content (% by weight) |
| --- | --- |
| Water | 72.3 |
| Diethylene glycol | 6.0 |
| Triethylene glycol butyl ether | 6.0 |
| Polyethylene glycol (#400) | 4.0 |
| C.I.27755 (black dye) | 4.5 |
| Olfine-E1010 (made by Nisshin Kagaku Kogyo K.K.) | 5.5 |
| $N(CH_2CH_2OH)_3$ | 0.2 |
| $Ca(OH)_2$/NaOH (19:1) | 0.2 |
| Sodium gluconate | 0.2 |
| 1,2-benzisothiazoline-3-on | 0.1 |
| Ethylalcohol | 1.0 |

Comparative Example 3

| Composition | Content (% by weight) |
| --- | --- |
| Water | 81.0 |
| Diethylene glycol | 6.0 |
| 2-pyrrolidone | 6.0 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $Ca(OH)_2$/NaOH (19:1) | 0.2 |
| Sodium gluconate | 0.2 |
| 1,2-benzisothiazoline-3-on | 0.1 |
| Ethylalcohol | 1.0 |

Comparative Example 4

| Composition | Content (% by weight) |
| --- | --- |
| Water | 81.0 |
| Diethylene glycol | 6.0 |
| Triethylene glycol butyl ether | 6.0 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $Ca(OH)_2$/NaOH (19:1) | 0.2 |
| Sodium gluconate | 0.2 |
| 1,2-benzisothiazoline-3-on | 0.1 |
| Ethylalcohol | 1.0 |

Comparative Example 5

| Composition | Content (% by weight) |
| --- | --- |
| Water | 72.5 |
| Diethylene glycol | 6.0 |
| Triethylene glycol butyl ether | 6.0 |
| Polyethylene glycol (#400) | 8.5 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $Ca(OH)_2$/NaOH (19:1) | 0.2 |
| Sodium gluconate | 0.2 |
| 1,2-benzisothiazoline-3-on | 0.1 |
| Ethylalcohol | 1.0 |

The inks obtained in Examples and Comparative Examples were studied with respect to surface tension, viscosity and pH at 25° C., keeping quality resistant to thermal shock and temperature dependency of surface tension and viscosity. Dot diameter and nozzle clogging were studied when the obtained ink was put into a practical machine for printing. The measuring method was as follows.

1) Keeping Quality Resistant to Thermal Shock

Ink preserved in a bottle made of polyethylene at 25° C. was left to stand at −20° C. and 50° C. respectively for 1 hour. This thermal shock was repeated three times a day for 1 week. The rate of change was ranked as follows:

○: The rate of change was 5% or less.

Δ: The rate of change was 10% or less (no problem on practical use).

X: The rate of change was more than 10% (no practical use).

2) Temperature Dependency

Rate of change of ink was studied between 10° C. and 35° C. regarding surface tension and viscosity. The rate of change was ranked in a way similar to the above item 1).

3) Test for Practical Use

Ink jet printer (MJ-500; made by Epson K.K.) was used.

Resistance to Light:

Printed images were subjected to sun lump exposure test for 200 hours according to ASTMD 795 (American Society for Testing Materials) to measure rate of change of image density before and after irradiation. The rate of temperature change was ranked in a way similar to the above item 1).

Nozzle Clogging Test:

Color chart (test chart having 20% of coating rate (size:A4) of the same color as ink was reproduced on 100 sheets of SF paper (made by Epson K.K) under high temperature and high humidity conditions (35° C., 85% RH).

Nozzle clogging was observed by microscope after printing. The nozzle with contaminants adhered was cleaned by rubber blade equipped in MJ-500 for cleaning. Evaluation was made as follows:

○:no contaminant was adhered around nozzle. Ink showed good utility.

Δ:Some contaminants were observed around nozzle, but the contaminants could be removed by cleaning. Printing properties have no practical problem.

X :Contaminants were adhered around nozzle. Dots became thin and defective. Some nozzles could not be recovered by cleaning. No utility.

The evaluation of "Δ" of no practical use was made by binary printing performed in Examples. Therefore even when the evaluation of "Δ" was obtained, there may arise practical inconvenience when dot diameter is made small or when gradation printing is made with dot diameter variable.

The results obtained above are shown in Table 1 below:

TABLE 1

| | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Surface tension (dyne/cm) 25° C. | 33.5 | 45.6 | 32.8 | 31.0 | 38.3 | 37.5 | 36.4 | 38.4 | 32.2 | 39.5 | 32.2 | 37.9 |
| Viscosity (cp) 25° C. | 2.1 | 2.5 | 3.6 | 3.8 | 4.2 | 1.7 | 2.3 | 2.0 | 2.7 | 1.9 | 2.2 | 2.7 |
| PH 25° C. | 8.0 | 8.5 | 8.5 | 9.0 | 9.2 | 7.6 | 8.2 | 7.8 | 8.8 | 7.7 | 9.1 | 8.4 |
| Keeping quality | ○ | ○ | ○ | ○ | ○ | ○ | Δ | x | x | Δ | x | Δ |
| Nozzle clogging test | ○ | ○ | ○ | ○ | ○ | ○ | ○ | Δ | x | Δ | Δ | x |
| Resistance to light | ○ | ○ | ○ | ○ | ○ | ○ | ○ | ○ | ○ | x | x | ○ |
| Temperature dependency | | | | | | | | | | | | |
| Surface tension | ○ | ○ | ○ | ○ | ○ | ○ | ○ | x | ○ | ○ | ○ | ○ |
| Viscosity | ○ | ○ | ○ | ○ | ○ | ○ | ○ | x | ○ | ○ | ○ | Δ |

What is claimed is:

1. An ink for ink-jetting, comprising:
   0.5–10% by weight of a coloring material,
   0.01–5.0% by weight of alkylene oxide adduct of acetylene glycol, represented by the formula (A):

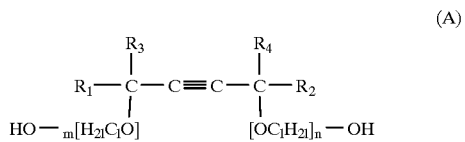

(A)

(in which $R_1$–$R_4$ are respectively an lower alkyl group; l is an integer of 2 or 3; and m and n are respectively an integer of 1 or more);

6.0–14.0% by weight of alkylene glycol represented by the formula (B):

(B)

(in which x and y is respectively an integer, provided that x is 2 or more and x and y have a relation of $2 \leq x \times y \leq 6$);

4.0–10.0% by weight of a lower alkyl ether of alkylene glycol represented by the formula (C):

(C)

(in which R is a lower alkyl group, p and q is respectively an integer, provided that p is 2 or more and p and q have a relation of $2 \leq p \times q \leq 6$), 2.0–8.0% by weight of polyalkylene glycol having a molecular weight of 150–600; and water, % by weight being based on total weight of the ink.

2. An ink of claim 1, in which the alkylene oxide adduct of acetylene glycol is contained at an amount of 0.1–5% by weight, and a total amount of the alkylene glycol, lower alkyl ether of alkylene glycol and polyalkylene glycol is 10–30% by weight.

3. An ink of claim 1, in which $R_1$ and $R_2$ are the same alkyl group having 1–5 carbon atoms, $R_3$ and $R_4$ are the same alkyl group having 1–5 carbon atoms, and m+n is within the range of 2–60.

4. An ink of claim 3, in which $R_1$ and $R_2$ are the same alkyl group having 2–4 carbon atoms, $R_3$ and $R_4$ are respectively a methyl group, and m+n is within the range of 2–30.

5. An ink of claim 1, having a surface tension between 30 and 50 dyn/cm at 25° C.

6. An ink of claim 1, in which an aliphatic alcohol is contained at an amount of 0.1–15% by weight.

7. An ink of claim 6, in which the aliphatic alcohol is an alkyl alcohol having an alkyl group of 1–5 carbon atoms.

8. An ink of claim 1, in which an amphiphilic agent is contained at an amount of 0.01–5% by weight.

9. An ink of claim 8, in which the amphiphilic agent is selected from the group consisting of an urea, an amide, a cyclic amide, an alkanol amine and a mixture thereof.

10. An ink of claim 9, in which the amphiphilic agent is triethanolamine and contained at an amount of 0.1–2% by weight.

11. An ink for ink-jetting, comprising:
    0.5–10% by weight of a coloring material,
    0.01–5.0% by weight of alkylene oxide adduct of acetylene glycol, represented by the formula (A):

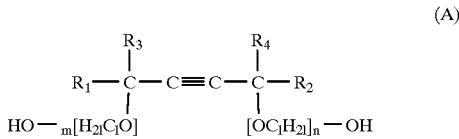

(A)

(in which $R_1$–$R_4$ are respectively an lower alkyl group; "l" is an integer of 2 or 3; and m and n are respectively an integer of 1 or more);

6.0–14.0% by weight of a polyalcohol having three hydroxy groups;

4.0–10.0% by weight of a lower alkyl ether of alkylene glycol represented by the formula (C):

(C)

(in which R is a lower alkyl group, p and q is respectively an integer, provided that p is 2 or more and p and q have a relation of $2 \leq p \times q \leq 6$), 2.0–8.0% by weight of polyalkylene glycol having a molecular weight of 150–600; and water, % by weight being based on total weight of the ink.

12. An ink of claim 11, in which the alkylene oxide adduct of acetylene glycol is contained at an amount of 0.1–5% by weight, and a total amount of the polyalcohol, lower alkyl ether of alkylene glycol and polyalkylene glycol is 10–30% by weight.

13. An ink of claim 11, in which $R_1$ and $R_2$ are the same alkyl group having 1–5 carbon atoms, $R_3$ and $R_4$ are the same alkyl group having 1–5 carbon atoms, and m+n is within the range of 2–60.

14. An ink of claim 13, in which $R_1$ and $R_2$ are the same alkyl group having 2–4 carbon atoms, $R_3$ and $R_4$ are a metyhl group, and m+n is within the range of 2–30.

15. An ink of claim 11, having a surface tension between 30 and 50 dyn/cm at 25° C.

16. An ink of claim 11, in which an aliphatic alcohol is contained at an amount of 0.1–15% by weight.

17. An ink of claim 16, in which the aliphatic alcohol is an alkyl alcohol having an alkyl group of 1–5 carbon atoms.

18. An ink of claim 11, in which an amphiphilic agent is contained at an amount of 0.01–5% by weight.

19. An ink of claim 18, in which the amphiphilic agent is selected from the group consisting of an urea, an amide, a cyclic amide, an alkanol amine and a mixture thereof.

20. An ink of claim 19, in which the amphiphilic agent is triethanolamine and contained at an amount of 0.1–2% by weight.

* * * * *